US009569279B2

(12) United States Patent
Hicok et al.

(10) Patent No.: US 9,569,279 B2
(45) Date of Patent: Feb. 14, 2017

(54) HETEROGENEOUS MULTIPROCESSOR DESIGN FOR POWER-EFFICIENT AND AREA-EFFICIENT COMPUTING

(71) Applicant: NVIDIA CORPORATION, Santa Clara, CA (US)

(72) Inventors: Gary D. Hicok, Mesa, AZ (US); Matthew Raymond Longnecker, San Jose, CA (US); Rahul Gautam Patel, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 309 days.

(21) Appl. No.: 13/723,995

(22) Filed: Dec. 21, 2012

(65) Prior Publication Data
US 2014/0181501 A1    Jun. 26, 2014

(51) Int. Cl.
*G06F 1/26* (2006.01)
*G06F 9/50* (2006.01)

(52) U.S. Cl.
CPC ............ *G06F 9/5094* (2013.01); *Y02B 60/142* (2013.01)

(58) Field of Classification Search
CPC .............................. G06F 9/5094; G06F 60/142
USPC ................................................. 713/300, 320
See application file for complete search history.

(56) References Cited

U.S. PATENT DOCUMENTS

| 6,314,515 | B1 | 11/2001 | Miller et al. |
| 6,501,999 | B1 * | 12/2002 | Cai ....................... G06F 1/3203 700/82 |
| 6,732,280 | B1 | 5/2004 | Cheok et al. |
| 6,804,632 | B2 | 10/2004 | Orenstien et al. |
| 6,981,083 | B2 * | 12/2005 | Arimilli .................. G06F 9/462 710/260 |
| 7,093,147 | B2 * | 8/2006 | Farkas et al. .................. 713/320 |
| 7,210,139 | B2 * | 4/2007 | Hobson et al. ................ 717/149 |
| 7,383,423 | B1 | 6/2008 | Hughes |
| 7,412,353 | B2 | 8/2008 | Borker et al. |
| 7,421,602 | B2 | 9/2008 | Sutardja |

(Continued)

FOREIGN PATENT DOCUMENTS

| EP | 2254048 A1 | 11/2010 |
| TW | I311729 B | 7/2009 |

(Continued)

OTHER PUBLICATIONS

NVDIA (Variable SMP—A Multiple-Core CPU Architecture for Low Power and High Performance); Whitepaper; 2011, 16 pages.

(Continued)

*Primary Examiner* — Mark Connolly
(74) *Attorney, Agent, or Firm* — Artegis Law Group, LLP (57) ABSTRACT

A technique for managing processor cores within a multi-core central processing unit (CPU) provides efficient power and resource utilization over a wide workload range. The CPU comprises at least one core designed for low power operation and at least one core designed for high performance operation. For low workloads, the low power core executes the workload. For certain higher workloads, the high performance core executes the workload. For certain other workloads, the low power core and the high performance core both share execution of the workload. This technique advantageously enables efficient processing over a wider range of workloads than conventional systems.

23 Claims, 4 Drawing Sheets

(56) References Cited

U.S. PATENT DOCUMENTS

| | | | |
|---|---|---|---|
| 7,434,002 B1 | 10/2008 | Zedlewski et al. | |
| 7,587,716 B2* | 9/2009 | Yoshimura | 718/100 |
| 7,730,335 B2 | 6/2010 | Sutardja et al. | |
| 7,788,514 B2 | 8/2010 | Sutardja et al. | |
| 8,140,876 B2* | 3/2012 | Arnold et al. | 713/320 |
| 8,166,324 B2 | 4/2012 | Youngs | |
| 8,180,997 B2* | 5/2012 | Burger et al. | 712/15 |
| 8,284,205 B2 | 10/2012 | Miller et al. | |
| 2003/0101362 A1 | 5/2003 | Dia | |
| 2003/0120910 A1 | 6/2003 | Schmisseur et al. | |
| 2004/0215926 A1 | 10/2004 | Arimilli et al. | |
| 2004/0215987 A1 | 10/2004 | Farkas et al. | |
| 2005/0013705 A1 | 1/2005 | Farkas et al. | |
| 2005/0050373 A1 | 3/2005 | Orenstien et al. | |
| 2006/0095807 A1 | 5/2006 | Grochowski et al. | |
| 2007/0074011 A1 | 3/2007 | Borkar et al. | |
| 2007/0083785 A1 | 4/2007 | Sutardja | |
| 2007/0136617 A1 | 6/2007 | Kanno et al. | |
| 2008/0263324 A1 | 10/2008 | Sutardja et al. | |
| 2008/0307244 A1 | 12/2008 | Bertelsen et al. | |
| 2009/0055826 A1 | 2/2009 | Bernstein et al. | |
| 2009/0172423 A1 | 7/2009 | Song et al. | |
| 2009/0222654 A1 | 9/2009 | Hum et al. | |
| 2009/0235260 A1 | 9/2009 | Branover et al. | |
| 2009/0259863 A1 | 10/2009 | Williams et al. | |
| 2009/0292934 A1 | 11/2009 | Esliger | |
| 2009/0300396 A1 | 12/2009 | Watanbe | |
| 2010/0146513 A1 | 6/2010 | Song | |
| 2010/0153954 A1 | 6/2010 | Morrow et al. | |
| 2010/0162014 A1 | 6/2010 | Memon et al. | |
| 2011/0022833 A1 | 1/2011 | Nussman et al. | |
| 2011/0314314 A1 | 12/2011 | Sengupta | |
| 2012/0102344 A1 | 4/2012 | Kocev et al. | |
| 2012/0151225 A1* | 6/2012 | Huang et al. | 713/300 |
| 2012/0159496 A1* | 6/2012 | Dighe et al. | 718/102 |
| 2012/0185709 A1* | 7/2012 | Weissmann et al. | 713/320 |
| 2012/0266179 A1* | 10/2012 | Osborn et al. | 718/105 |
| 2013/0124890 A1 | 5/2013 | Priel et al. | |
| 2013/0238912 A1* | 9/2013 | Priel | G06F 1/324 713/300 |
| 2013/0346771 A1* | 12/2013 | Boom et al. | 713/320 |

FOREIGN PATENT DOCUMENTS

| | | |
|---|---|---|
| TW | 1340900 B | 4/2011 |
| WO | 2006037119 A2 | 4/2006 |

OTHER PUBLICATIONS

Tanenbaum (Structured Computer Organization: Third Edition); Prentice-Hall, Inc, 1990; 5 pages.

Kumar et al. (Single-ISA Heterogenous Multi-Core Architecture: The potential for processor Power Reduction); MICRO 36 Proceedings of the 36th annual IEEE/ACM International Symposium on Microarchitecture; 12 pages.

Non-Final Office Action for U.S. Appl. No. 13/604,390, dated Nov. 13, 2014.

International Search Report for Application No. GB1108715.2, dated Sep. 23, 2011.

International Search Report for Application No. GB1108716.0, dated Sep. 28, 2011.

International Search Report for Application No. GB1108717.8 dated Sep. 30, 2011.

Non-Final Office Action for U.S. Appl. No. 12/787,359, dated Aug. 30, 2012.

Non-Final Office Action for U.S. Appl. No. 13/360,559, dated Oct. 18, 2013.

Non-Final Office Action for U.S. Appl. No. 13/360,559, dated Apr. 8, 2014.

Non-Final Office Action for U.S. Appl. No. 12/787,361, dated Sep. 13, 2012.

Non-Final Office Action for U.S. Appl. No. 13/604,496, dated Sep. 10, 2015.

* cited by examiner

HETEROGENEOUS MULTIPROCESSOR DESIGN FOR POWER-EFFICIENT AND AREA-EFFICIENT COMPUTING

CROSS-REFERENCE TO RELATED APPLICATIONS

This application claims benefit of the United States Provisional Patent Application having Ser. No. 61/678,026, filed on Jul. 31, 2012, which is hereby incorporated herein by reference.

BACKGROUND OF THE INVENTION

Field of the Invention

The present invention generally relates to multiprocessor computer systems and, more specifically, to a heterogeneous multiprocessor design for power-efficient and area-efficient computing.

Description of the Related Art

Battery-powered mobile computing platforms have become increasingly important in recent years, intensifying the need for efficient, low power systems that deliver highly scalable computational capacity with diminishing cost. A typical mobile device may need to operate over a wide performance range, according to workload requirements. Different performance ranges are conventionally mapped to a different operating mode, with power consumption proportionally related to performance within a given operating mode. In a low-power sleep mode, the mobile device may provide a small amount of computational capacity, such as to maintain radio contact with a cellular tower. In an active mode, the mobile device may provide low-latency response to user input, for example via a window manager. Many operations associated with typical applications execute with satisfactory performance in an active mode. In a high-performance mode, the mobile device needs to provide peak computational capacity, such as to execute a real-time game or perform transient user-interface operations. Active mode and high-performance mode typically require progressively increasing power consumption.

A number of techniques have been developed to improve both performance and power efficiency for mobile devices. Such techniques include reducing device parasitic loads by reducing device size, reducing operating and threshold voltages, trading off performance for power-efficiency, and adding different circuit configurations tuned to operate well under certain operating modes.

In one example, a mobile device processor complex comprises a low-power, but low-performance processor and a high-performance, but high-power processor. In idle and low activity active modes, the low-power processor is more power efficient at lower performance levels and is therefore selected for execution, while in high-performance modes, the high-performance processor is more power efficient and is therefore selected for execution of larger workloads. In this scenario, the trade-off space includes a cost component since the mobile device carries a cost burden of two processors, where only one processor can be active at a time. While such a processor complex enables both low power operation and high-performance operation, the processor complex makes inefficient use of expensive resources.

As the foregoing illustrates, what is needed in the art is a more efficient technique for accommodating a wide range of different workloads.

SUMMARY OF THE INVENTION

One embodiment of the present invention sets forth a method for configuring one or more cores within a processing unit for executing different workloads, the method comprising receiving information related to a new workload, determining, based on the information, that the new workload is different than a current workload, determining how many of the one or more cores should be configured to execute the new workload based on the information, determining whether a new core configuration is needed based on how many of the one or more cores should be configured to execute the new workload, and if a new core configuration is needed, then transitioning the processing unit to the new core configuration, or if a new core configuration is not needed, then maintaining a current core configuration for executing the new workload.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed technique is that it advantageously improves power efficiency of a multi-core central processing unit over a wide workload range, while efficiently utilizing processing resources.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
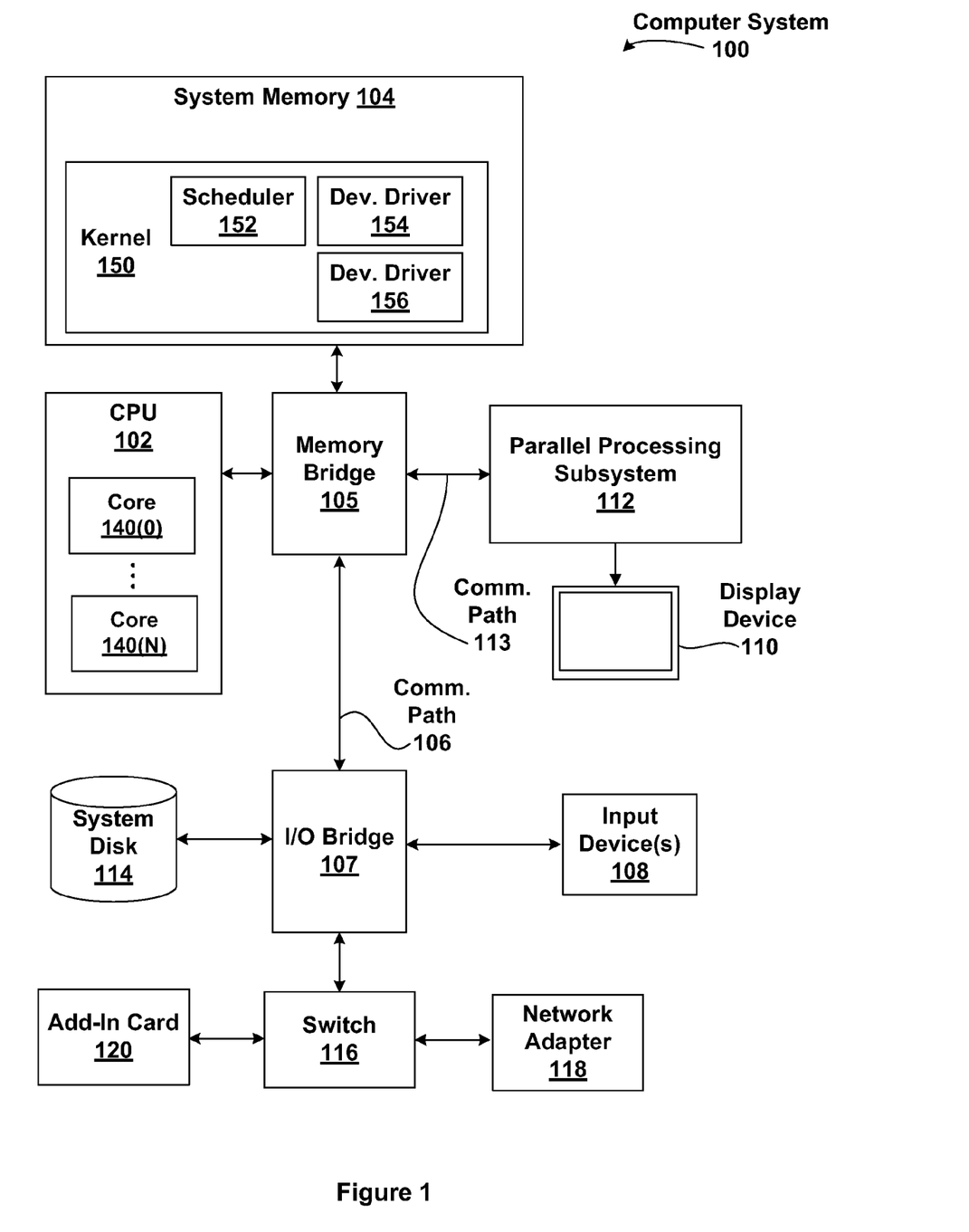
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input device(s) 108 (e.g., keyboard, pointing device, capacitive touch tablet) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI)Express, Accelerated Graphics Port, or HyperTransport link). In one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in card 120. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in card 120 are connect directly to I/O bridge 107. In still other embodiments, computer system 100 comprises a mobile device and network adapter 118 implements a digital wireless communications subsystem. In such embodiments, input devices 108 comprise a touch tablet input subsystem and display device 110 implements a mobile screen subsystem, such as a liquid crystal display module.

CPU 102 comprises at least two processor cores 140(0), 140(N). A first processor core 140(0) is designed for low power operation, while a second processor core 140(N) is design for high performance operation. In one embodiment, a symmetric number of low power and high performance processor cores are implemented within CPU 102. An operating system kernel 150 residing in system memory 104 includes a scheduler 152 and device drivers 154, 156. Kernel 150 is configured to provide certain conventional kernel services, including services related to process and thread management. Scheduler 152 is configured to manage thread and process allocation to different processor cores 140 within CPU 102. Device driver 154 is configured to manage which processor cores 140 are enabled for use and which are disabled, such as via powering down. Device driver 156 is configured to manage parallel processing subsystem 112, including processing and buffering command and input data streams to be processed.

Heterogeneous Multiprocessor

Figure 2:
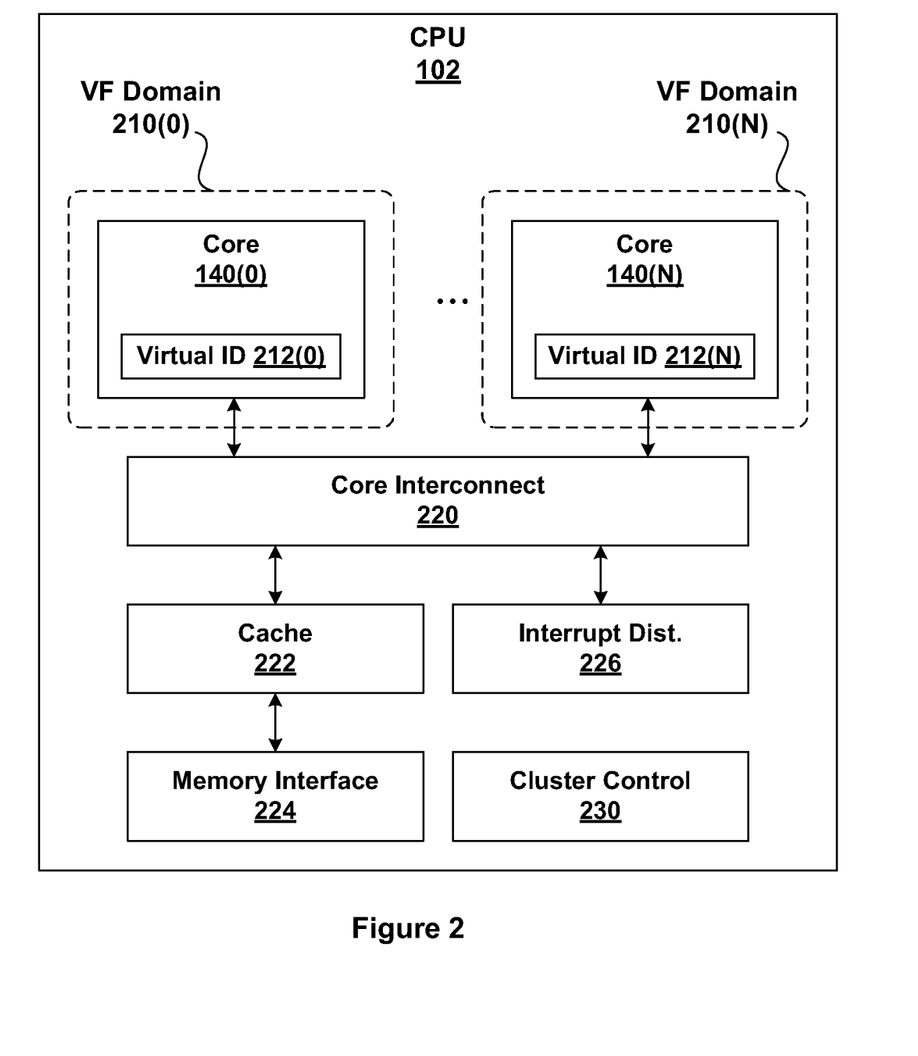
FIG. 2 is a block diagram of a central processing unit (CPU) of the computer system of FIG. 1, according to one embodiment of the present invention.

FIG. 2 is a block diagram of CPU 102 of computer system 100 of FIG. 1, according to one embodiment of the present invention. As shown, CPU 102 includes at least two cores 140(0), 140(N), a core interconnect 220, a cache 222, a memory interface 224, an interrupt distributor 226, and a cluster control unit 230.

Each core 140 may operate within a corresponding voltage-frequency (VF) domain, distinct from other VF domains. For example, circuitry associated with core 140(0) may operate on a first voltage and first operating frequency associated with VF domain 210(0), while circuits associated with core 140(N) may operate on a second voltage and a second frequency associated with VF domain 210(N). In this example, each voltage and each frequency may be varied independently within technically feasible ranges to achieve certain power and performance goals.

In this example, core 140(0) is designed for low power operation, while core 140(N) is designed for high performance operation, while preserving mutual instruction set architecture (ISA) compatibility. Core 140(N) may achieve higher performance via any applicable technique, such as circuit design directed to high clock speeds, logic design directed to simultaneously issuing and processing multiple concurrent instructions, and architectural design directed to improved cache size and performance. Design trade-off associated with core 140(N) may tolerate increased marginal power consumption to achieve greater marginal execution performance. Core 140(0) may achieve lower power operation via circuit design directed to reducing leakage current, crossbar current, and parasitic loss, logic design directed to reducing switching energy associated with processing an instruction. Design trade-offs associated with core 140(0) should generally favor reducing power consumption, even at the expense of clock speed and processing performance.

Each core 140 includes a programmable virtual identifier (ID) 212, which identifies the processor core. Each core 140 may be programmed with an arbitrary core identifier via virtual ID 212, which may be associated with a particular thread or processed maintained by scheduler 152. Each core 140 may include logic to facilitate replicating internal execution state to another core 140.

In one embodiment, core interconnect 220 couples cores 140 to a cache 222, which is further coupled to a memory interface 224. Core interconnect 220 may be configured to facilitate state replication between cores 140. Interrupt distributor 226 is configured to receive an interrupt signal and transmit the interrupt signal to an appropriate core 140, identified by a value programmed within virtual ID 212. For example, an interrupt that is targeted for core zero will be directed to whichever core 140 has a virtual ID 212 programmed to zero.

Cluster control unit 230 manages availability state for each core 140, which may be individually hot plugged in to become available or hot plugged out to no longer be available. Prior to hot plugging a specified core out, cluster control unit 230 may cause execution state for the core to be replicated to another core for continued execution. For example, if execution should transition from a low power core to a high performance core, then execution state for the low power core may be replicated to the high performance core before the high performance core begins executing. Execution state is implementation specific and may include, without limitation, register data, translation buffer data, and cache state.

In one embodiment, cluster control unit 230 is configured to power off one or more voltage supplies to a core that has been hot plugged out and to power on one or more voltage supplies to a core that has been hot plugged in. For example, cluster control unit 230 may power off a voltage supply associated with VF domain 210(0) to hot plug out core 140(0). Cluster control unit 230 may also implement frequency control circuitry for each core 140. Cluster control unit 230 receives commands from a cluster switch software module residing within device driver 154. The cluster switch manages transitions between core configurations. For example, cluster switch is able to direct each core to save context, including a virtual ID 212, and to load a saved context, including an arbitrary virtual ID 212. The cluster switch may include hardware support for saving and loading context via cluster control unit 230. Control unit 230 may provide automatic detection of workload changes and indicate to the cluster switch that a new workload requires a new configuration. The cluster switch then directs control unit 230 to transition a workload form one core 140 to another core 140, or enable additional cores via hot plugging in the additional cores.

Figure 3:
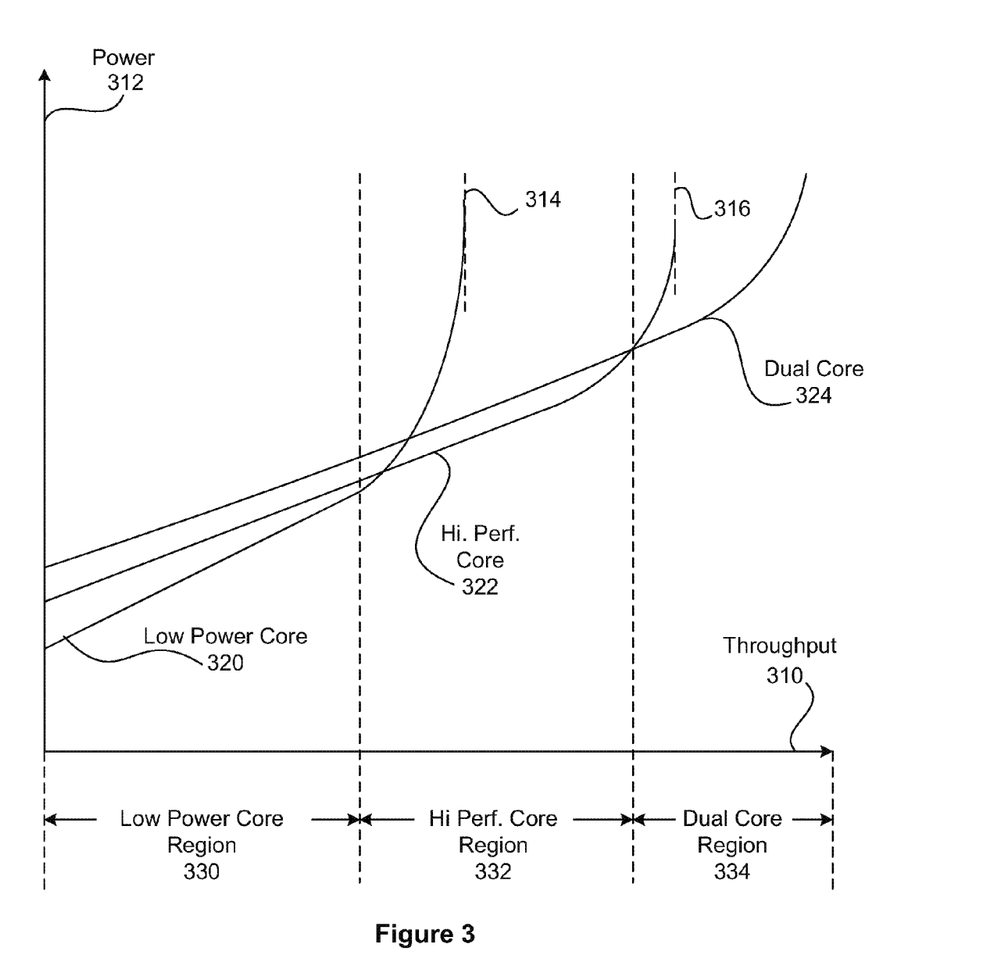
FIG. 3 illustrates different operating regions of a CPU comprising multiple cores, according to one embodiment of the present invention.

FIG. 3 illustrates different operating regions of a CPU comprising multiple cores, according to one embodiment of the present invention. The CPU, such as CPU 102 of FIG. 1, includes at least a low power core 140(0) and a high performance core 140(N). As shown, a power curve 320 for low power core 140(0) is plotted as a function of throughput 310. Similarly, a power curve 322 is plotted for high performance core 140(N), and a power curve 324 is plotted for a dual core configuration. Throughput 310 is defined here as instructions executed per second, while power 312 is defined in units of power, such as watts (or a fraction thereof), needed to sustain a corresponding throughput 310.

A core clock frequency may be varied to achieve continuously different levels of throughput along the throughput 310 axis. As shown, low power core 140(0) has a maximum throughput that is lower than a maximum throughput for high performance core 140(N). In one implementation scenario, high performance core 140(N) is able to operate at a higher clock frequency than low power core 140(0). In a dual core mode associated with power curve 324, low power core 140(0) may be driven with one clock frequency that is in an associated upper operating range, while high performance core 140(N) may be driven with a different clock frequency that is in an associated medium operating range. In one configuration, each core 140(0), 140(N) in dual core mode is driven with an identical clock frequency within range of both cores. In a different configuration, each core 140(0), 140(N) in dual core mode is driven with a different clock within an associated range of each core. In one embodiment, each clock frequency may be selected to achieve similar forward execution progress for each core. In certain embodiments, cores 140 are configured to operate from a common voltage supply and may operate from independent clock frequencies.

Within a low power core region 330, low power core 140(0) is able to satisfy throughput requirements using the least power of the three core configurations (low power, high performance, dual core). Within a high performance core region 332, high performance core 140(N) is able to satisfy throughput requirements using the least power of the three core configurations, while extending throughput 310 beyond a maximum throughput 314 for low power core 140(0). Within a dual core region 334, operating both low power core 140(0) and high performance core 140(N) simultaneously may achieve a throughput that is higher than a maximum throughput 316 for high performance core 140(N), thereby extending overall throughput, but at the expense of additional power consumption.

Given the three operating regions 330, 332, 334, and one low power core 140(0) and one high-performance core 140(N), six direct state transitions are supported between different core configurations. A first state transition is between region 330 and region 332; a second state transition is between region 332 and region 330; a third state transition is between region 330 and region 334; a fourth state transition is between region 334 and region 330; a fifth state transition is between region 332 and region 334; and a sixth state transition is between region 334 and region 332. Persons skilled in the art will recognize that additional cores may add additional operating regions and additional potential state transitions between core configurations without departing the scope and spirit of the present invention.

In one embodiment, cores 140 within CPU 102 are characterized in terms of power consumption and throughput as a function voltage and frequency. A resulting characterization comprises a family of power curves and different operating regions having different power requirements. The different operating regions may be determined statically for a given CPU 102 design. The different operating regions may be stored in tables within device driver 154, which is then able to configure CPU 102 to hot plug in and hot plug out different cores 140 based on a prevailing workload requirements. In one embodiment, device driver 154 reacts to current workload requirements and reconfigures different cores 140 within CPU 102 to best satisfy the requirements. In another embodiment, scheduler 152 is configured to schedule workloads according to available cores 140. Scheduler 152 may direct device driver 154 to hot plug in or hot plug out different cores based on present and future knowledge of workload requirements.

Figure 4:
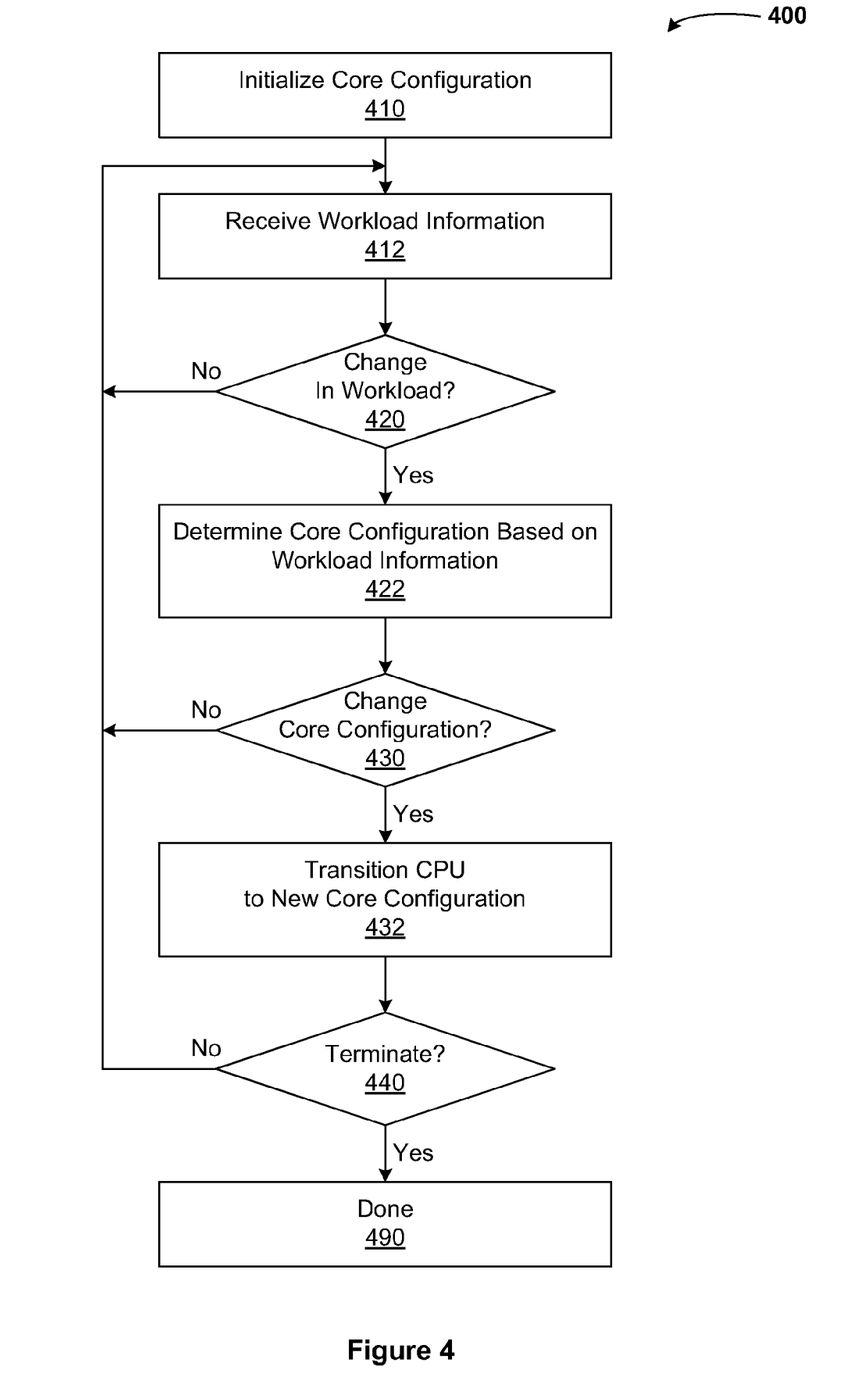
FIG. 4 is a flow diagram of method steps for configuring a CPU comprising multiple cores to operate within a power-efficient region, according to one embodiment of the present invention.

FIG. 4 is a flow diagram of method steps for configuring a multi-core CPU to operate within a power-efficient region, according to one embodiment of the present invention. Although the method steps are described in conjunction with the systems of FIGS. 1-2, persons of ordinary skill in the art will understand that any system configured to perform the method steps, in any order, is within the scope of the invention. In one embodiment, the method steps are performed by CPU 102 of FIG. 1.

As shown, a method 400 begins in step 410, where cluster control unit 230 of FIG. 2 initializes core configuration for CPU 102. In one embodiment, cluster control unit 230 initializes core configuration for CPU 102 to reflect availability of low power core 140(0) of FIG. 1. In this configuration, core 140(0) executes an operating system boot chronology, including loading and initiating execution of kernel 150.

In step 412, device driver 154 receives workload information. The workload information may include, without limitation, CPU load statistics, latency statistics, and the like. The workload information may be received from cluster control unit 230 within CPU 102 or from conventional kernel task and thread services. If, in step 420, there is a change in workload reflected by the workload information, then the method proceeds to step 422, otherwise, the method proceeds back to step 412. In step 422, the device driver determines a matching core configuration to support the new workload information. The driver may use statically precomputed workload tables that map power curve information to efficient core configurations that support a required workload reflected in the workload information.

If, in step 430 the matching core configuration represents a change to the current core configuration, then the method proceeds to step 432, otherwise, the method proceeds back to step 412. In step 432, the device driver causes CPU 102 to transition to the matching core configuration. The transition process may involve hot plugging one or more core in and may also involve hot plugging one or more core out, as a function of differences between a current core configuration and the matching core configuration.

If, in step 440, the method should terminate, then the method proceeds to step 490, otherwise the method proceeds back to step 412. The method may need to terminate upon receiving a termination signal, such as during an overall shutdown event.

In sum, a technique is disclosed for managing processor cores within a multi-core CPU. The technique involves hot plugging core resources in and hot plugging core resources out as needed. Each core includes a virtual ID to allow the core execution context to be abstracted away from a particular physical core circuit. As system workload increases, core configurations may be changed to support the increases. Similarly, as system workload decreases, core configurations may be changed to reduce power consumption while supporting the reduced workload.

One advantage of the disclosed technique is that it advantageously improves power efficiency of a multi-core central processing unit over a wide workload range, while efficiently utilizing processing resources.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for configuring two or more cores within a processing unit for executing different workloads, the method comprising:
   receiving information related to a new workload;
   determining, based on the information, that the new workload is different than a current workload;
   retrieving characterization data associated with power consumption characterizations for each core included in the two or more cores;
   determining how many of the two or more cores should be configured to execute the new workload based on the information and the characterization data;
   determining whether a new core configuration is needed based on how many of the two or more cores should be configured to execute the new workload;
   if a new core configuration is needed, then transitioning the processing unit to the new core configuration, or
   if a new core configuration is not needed, then maintaining a current core configuration for executing the new workload;
   receiving a first interrupt associated with a first logical core identifier and related to the new workload; and
   transmitting the first interrupt to a first core included in the two or more cores that is executing the new workload and is associated with a programmable identifier matching the first logical core identifier.

2. The method of claim 1, wherein only a low-power core executes work in the current core configuration, and determining how many of the two or more cores should be configured comprises determining that only a high-performance core should be configured to execute the new workload, and further comprising determining that a new core configuration is needed, and transitioning the processing unit by turning off the low-power core, and turning on the high-performance core to execute the new workload.

3. The method of claim 1, wherein only a high-performance core executes work in the current core configuration, and determining how many of the two or more cores should be configured comprises determining that only a low-power core should be configured to execute the new workload, and further comprising determining that a new core configuration is needed, and transitioning the processing unit by turning off the high-performance core, and turning on the low-power core to execute the new workload.

4. The method of claim 1, wherein only a low-power core executes work in the current core configuration, and determining how many of the two or more cores should be configured comprises determining that both the low-power core and a high-performance core should be configured to execute the new workload, and further comprising determining that a new core configuration is needed, and transitioning the processing unit by turning on the high-performance core to execute the new workload.

5. The method of claim 1, wherein only a high-performance core executes work in the current core configuration, and determining how many of the two or more cores should be configured comprises determining that both a low-power core and the high-performance core should be configured to execute the new workload, and further comprising determining that a new core configuration is needed, and transitioning the processing unit by turning on the low-power core to execute the new workload.

6. The method of claim 1, wherein both a low-power core and a high-performance core execute work in the current core configuration, and determining how many of the two or more cores should be configured comprises determining that only the high-performance core should be configured to execute the new workload, and further comprising determining that a new core configuration is needed, and transitioning the processing unit by turning off the low-power core to execute the new workload.

7. The method of claim 1, wherein both a low-power core and a high-performance core execute work in the current core configuration, and determining how many of the two or more cores should be configured comprises determining that only the low-power core should be configured to execute the new workload, and further comprising determining that a new core configuration is needed, and transitioning the processing unit by turning off the high-performance core to execute the new workload.

8. The method of claim 1, wherein the processing unit comprises a central processing unit or a graphics processing unit.

9. The method of claim 1, wherein each core included in the two or more cores is identifiable via a programmable identifier, and two or more programmable identifiers are used in transitioning the processing unit to the new core configuration.

10. The method of claim 1, wherein determining how many of the two or more cores should be configured to execute the new workload comprises determining a subset of the two or more cores that is capable of satisfying throughput requirements of the new workload with less power consumption relative to all other potential subsets of the two or more cores based on the characterization data.

11. The method of claim 1, wherein transitioning the processing unit to the new core configuration includes power on or powering off at least one of the two or more cores based on information associated with a future workload.

12. A non-transitory computer-readable storage medium including instructions that, when executed by a processing unit, cause the processing unit to configure two or more cores within the processing unit for executing different workloads, the method comprising:
  receiving information related to a new workload;
  determining, based on the information, that the new workload is different than a current workload;
  retrieving characterization data associated with power consumption characterizations for each core included in the two or more cores;
  determining how many of the two or more cores should be configured to execute the new workload based on the information and the characterization data;
  determining whether a new core configuration is needed based on how many of the two or more cores should be configured to execute the new workload;
  if a new core configuration is needed, then transitioning the processing unit to the new core configuration, or
  if a new core configuration is not needed, then maintaining a current core configuration for executing the new workload;
  receiving a first interrupt associated with a first logical core identifier and related to the new workload; and
  transmitting the first interrupt to a first core included in the two or more cores that is executing the new workload and is associated with a programmable identifier matching the first logical core identifier.

13. The computer-readable storage medium of claim 12, wherein only a low-power core executes work in the current core configuration, and determining how many of the two or more cores should be configured comprises determining that only a high-performance core should be configured to execute the new workload, and further comprising determining that a new core configuration is needed, and transitioning the processing unit by turning off the low-power core, and turning on the high-performance core to execute the new workload.

14. The computer-readable storage medium of claim 12, wherein only a high-performance core executes work in the current core configuration, and determining how many of the two or more cores should be configured comprises determining that only a low-power core should be configured to execute the new workload, and further comprising determining that a new core configuration is needed, and transitioning the processing unit by turning off the high-performance core, and turning on the low-power core to execute the new workload.

15. The computer-readable storage medium of claim 12, wherein only a low-power core executes work in the current core configuration, and determining how many of the two or more cores should be configured comprises determining that both the low-power core and a high-performance core should be configured to execute the new workload, and further comprising determining that a new core configuration is needed, and transitioning the processing unit by turning on the high-performance core to execute the new workload.

16. The computer-readable storage medium of claim 12, wherein only a high-performance core executes work in the current core configuration, and determining how many of the two or more cores should be configured comprises determining that both a low-power core and the high-performance core should be configured to execute the new workload, and further comprising determining that a new core configuration is needed, and transitioning the processing unit by turning on the low-power core to execute the new workload.

17. The computer-readable storage medium of claim 12, wherein both a low-power core and a high-performance core execute work in the current core configuration, and determining how many of the two or more cores should be configured comprises determining that only the high-performance core should be configured to execute the new workload, and further comprising determining that a new core configuration is needed, and transitioning the processing unit by turning off the low-power core to execute the new workload.

18. The computer-readable storage medium of claim 12, wherein both a low-power core and a high-performance core execute work in the current core configuration, and determining how many of the two or more cores should be configured comprises determining that only the low-power core should be configured to execute the new workload, and further comprising determining that a new core configuration is needed, and transitioning the processing unit by turning off the high-performance core to execute the new workload.

19. The computer-readable storage medium of claim 12, wherein the processing unit comprises a central processing unit or a graphics processing unit.

20. The computer-readable storage medium of claim 12, wherein each core included in the two or more cores is identifiable via a programmable identifier, and one or more programmable identifiers are used in transitioning the processing unit to the new core configuration.

21. A computing device, comprising:
   a memory including instructions; and
   a central processing unit that is coupled to the memory and includes at least one low-power core and at least one high-performance core, the central processing unit programmed via the instructions to configure two or more cores for executing different workloads by:
      receiving information related to a new workload;
      determining, based on the information, that the new workload is different than a current workload;
      retrieving characterization data associated with power consumption characterizations for each core included in the two or more cores;
      determining how many of the two or more cores should be configured to execute the new workload based on the information and the characterization data;
      determining whether a new core configuration is needed based on how many of the two or more cores should be configured to execute the new workload;
      if a new core configuration is needed, then transitioning the processing unit to the new core configuration, or
      if a new core configuration is not needed, then maintaining a current core configuration for executing the new workload;
      receiving a first interrupt associated with a first logical core identifier and related to the new workload; and
      transmitting the first interrupt to a first core included in the two or more cores that is executing the new workload and is associated with a programmable identifier matching the first logical core identifier.

22. The computing device of claim 21, wherein each core included in the two or more cores is identifiable via a programmable identifier, and one or more programmable identifiers are used in transitioning the processing unit to the new core configuration.

23. The computing device of claim 21, wherein transitioning the processing unit to the new core configuration includes power on or powering off at least one of the two or more cores based on information associated with a future workload.

\* \* \* \* \*

UNITED STATES PATENT AND TRADEMARK OFFICE
CERTIFICATE OF CORRECTION

PATENT NO. : 9,569,279 B2  
APPLICATION NO. : 13/723995  
DATED : February 14, 2017  
INVENTOR(S) : Gary D. Hicok, Matthew Raymond Longnecker and Rahul Gautam Patel Page 1 of 1

It is certified that error appears in the above-identified patent and that said Letters Patent is hereby corrected as shown below:

On the Title Page

References Cited (56):

Please delete "TW    1311729 B    7/2009" and insert --TW    I311729 B    7/2009--;

Please delete "TW    1340900 B    4/2011" and insert --TW    I340900 B    4/2011--.

Signed and Sealed this  
Twentieth Day of June, 2017

Joseph Matal  
*Performing the Functions and Duties of the*  
*Under Secretary of Commerce for Intellectual Property and*  
*Director of the United States Patent and Trademark Office*